US006181798B1

(12) United States Patent
Steers

(10) Patent No.: US 6,181,798 B1
(45) Date of Patent: Jan. 30, 2001

(54) AUDIO SIGNAL FADER CONTROL SYSTEM AND METHOD THEREFOR

(75) Inventor: Hugh Steers, London (GB)

(73) Assignee: Tektronix, Inc., Beaverton, OR (US)

( * ) Notice: Under 35 U.S.C. 154(b), the term of this patent shall be extended for 0 days.

(21) Appl. No.: 08/826,647

(22) Filed: Apr. 4, 1997

(51) Int. Cl.[7] .......... H04B 1/00

(52) U.S. Cl. .......... 381/119

(58) Field of Search .......... 381/119, 98, 101, 381/104, 107

(56) References Cited

U.S. PATENT DOCUMENTS 5,054,077 * 10/1991 Suzuki .......... 381/119

* cited by examiner

*Primary Examiner*—Minsun Oh Harvey
(74) *Attorney, Agent, or Firm*—Francis I. Gray

(57) ABSTRACT

An audio signal fader control system has a control console including a motorized fader control. Signals from the console are transmitted over a transmission path to a host computer system. The control console and host computer system incorporate timing means such that when the audio signal is played back, the fader control is moved ahead of time by a predetermined amount so that inertia delay in the fader control and transmission path delays are overcome.

4 Claims, 3 Drawing Sheets

TIMETABLE

| COUNTER POSITION | FADER CONTROL POSITION |
|---|---|
| 0 0 0 0 | 0 |
| ⋮ | |
| 0 0 0 4 | 10 |
| 0 0 0 5 | 20 |
| 0 0 0 6 | 30 |
| ⋮ | |

AUDIO SIGNAL FADER CONTROL SYSTEM AND METHOD THEREFOR

CROSS-REFERENCE TO RELATED APPLICATION

Not applicable

STATEMENT REGARDING FEDERALLY SPONSORED RESEARCH OR DEVELOPMENT

Not applicable

BACKGROUND OF THE INVENTION

This invention relates to an audio signal fader control system and an operating method therefor.

Audio signal mixing is conventionally performed using an audio mixing desk which may have analog audio mixers or be digitally operated. In an analog audio mixer the audio signal is modified between input and output of the mixer by an editor applying gain and attenuation to the audio signal using slider fader controls.

In a digital system, the signal is processed with a digital signal processor (DSP) and values for gain and attenuation from fader controls are generated using an analog to digital converter (ADC) which communicates with the DSP.

The values generated by either the analog or the digital system are usually stored and later played back. If a digital system is used then digital position values are converted back to a voltage using a digital to analog converter (DAC), which voltage is used to drive a motorized fader control.

The process of driving a motorized fader control from stored or computed audio level control values is called "dynamic automation". When playing back the stored audio, the editor may modify the audio signal by revising the motorized fader control position. In this respect it is usual for the motorized fader control to have the motor drive disabled when the control is touched by an editor so as to avoid the motor being burned out. When the editor modifies the fader control position to modify the audio during play-back mode, the new fader position is stored.

A discussion of digital audio and digital fader controls can be found in "The Art of Digital Audio", 2nd Edition by John Watkinson at Section 2.8, page 48, published by Focal Press, ISBN 0-240-51320-7.

A problem with motorized fader controls is that they have inertia and that it takes a period of time for the fader to arrive at a new desired position. Furthermore, the fader control is usually located in a control console which is connected over a network to a host computer system. The network introduces communication delays which again lead to a time error in the motorized fader control arriving at a desired position.

The object of this invention is to provide dynamic automation with the capability of moving the motorized fader control to be at a desired position at a required time.

BRIEF SUMMARY OF THE INVENTION

According to a first aspect of this invention there is provided an audio signal fader control system including control means for receiving signals output by a motorized fader control means and for applying control signals to said fader control means, host computer means connected to said control means by transmission path means, and timing means associated with said control means and said host computer means for arranging said control signals from said host control means to be transmitted to said control means so that said control means is able to drive said fader control means to a desired position a predetermined period before said fader control means is actually required to be at said desired position.

Preferably said fader control means desired positions are in discrete steps and said control means includes interpolation means for interpolating locations of said fader control means between said desired points.

Conveniently, said host control means has a CPU and a real time clock, and said control means has counter means supplying data relative to a predetermined cyclical position of said counter means to said host CPU so as to provide synchronisation between said counter means and said host CPU.

Advantageously said host CPU has arithmetic means for adding said predetermined period to said real time and subtracting the real time at which said predetermined position of said counter means provides said synchronisation, and dividing the result by the control means counter means cycle rate to provide a predetermined value of said counter means, which predetermined value is used to drive said fader control means.

Advantageously said host control means is arranged to write a fader control means position to said control means at an integer multiple of said control means cycle rate, thereby providing over sampling of said control means.

According to a second aspect of this invention there is provided a method of operating an audio signal fader control system having control means for receiving signals output by a motorised fader control means and for applying control signals to said fader control means and a host computer means connected to said control means by transmission path means including the steps of arranging said control signals from said host control means to be transmitted to said control means so that said control means is able to drive said fader control means to a desired position a predetermined period before said fader control means is actually required to be at said desired position.

BRIEF DESCRIPTION OF THE SEVERAL VIEWS OF THE DRAWING

The invention will now be described by way of example with reference to the accompanying drawings in which.

In the Figures like reference numerals denote like parts.

DETAILED DESCRIPTION OF THE INVENTION

Figure 1:
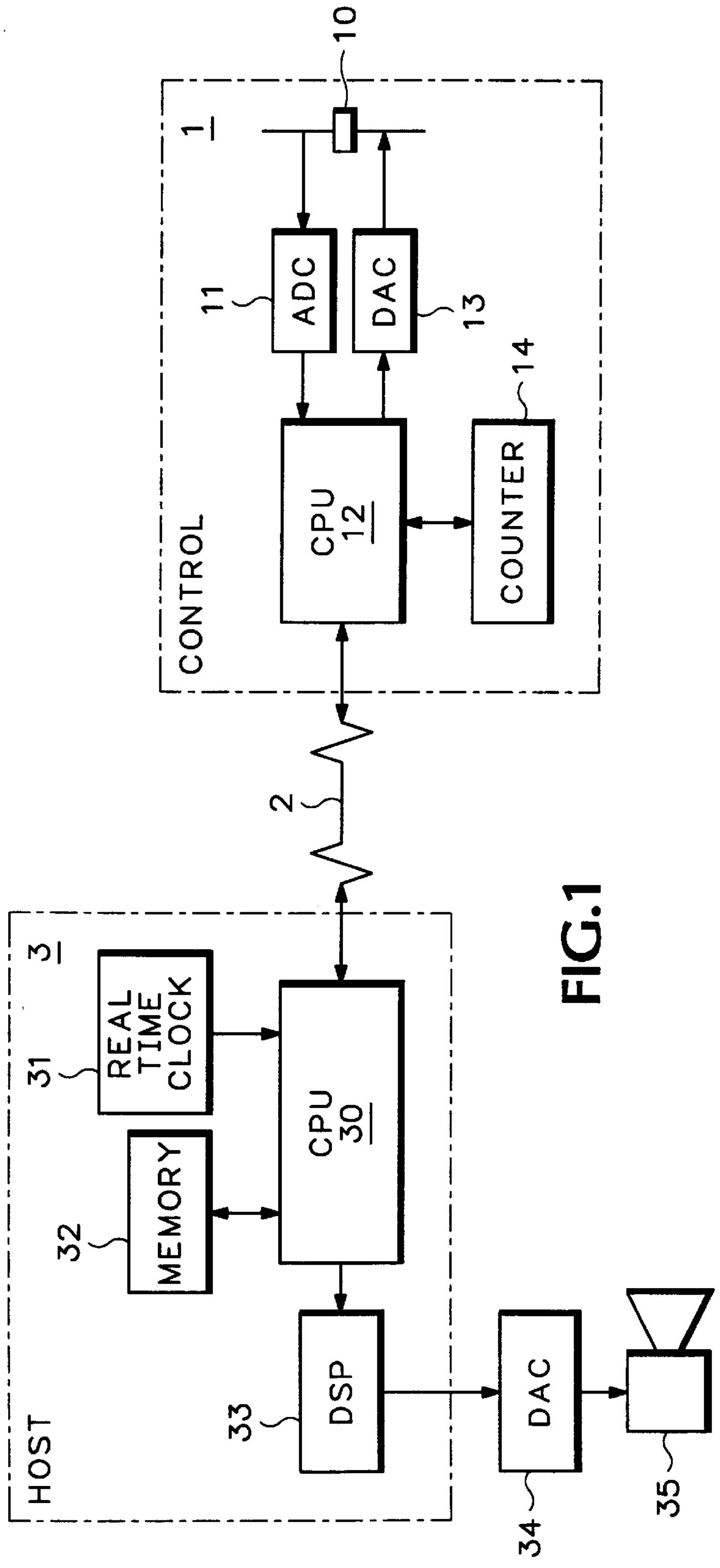
FIG. 1 shows a block schematic diagram of an audio signal fader control in accordance with this invention.

The audio signal fader control system shown in FIG. 1 has a control console 1 connected by a transmission path 2 to a host computer system 3. The control console includes a motorised fader 10 providing output via an analog to digital converter 11 to a CPU 12 of the control console. The control console CPU provides control signals to the motorised fader 10 via a digital to analog converter 13. The CPU 12 is connected to a counter 14 which is incremented at, for example, 5 ms intervals so that the counter counts up from zero to 256 and then returns to zero.

The CPU 12 connects to a host computer system CPU 30 via the transmission path 2. The transmission path 2 may be an Ethernet network or, for example, an RS 232 Serial Communication Routing.

The CPU 30 is connected with a real time clock 31 and a memory disk drive 32 and also with a digital signal processor 33. The digital signal processor is connected to a digital to analog converter 34 for driving a speaker 35.

The real time clock 31 is used as a timing reference for synchronisation of events between the host computer system 3 and the control console 1.

The audio signal fader control system has a messaging protocol involving two kinds of message. The first message type is one from the host CPU 30 to the control console CPU 12 containing the following information:

| | <fader identifier> | <position> | <time> |
|---|---|---|---|
| e.g. | 1 | 13 | 05 |
| | 1 | 20 | 10 |

The fader identifier is required since there may be up to four, or even more, fader controls. The position information is indicative of the position of the fader control along its track, and the time is indicative of the time, in real time, at which the fader control is to be at its desired position. Thus the first message is an instruction to the control console CPU 12 to position the identified fader control to a required position at a given time.

The second message is from the control console CPU 12 to the CPU 30 and is for time synchronisation:

<sync>

The control console CPU 12 has no real time clock but utilises the numeric counter 14. Whenever the counter 14 reaches the value 256, it is reset to zero and a <sync> message is sent to the host CPU 30.

On receipt of the <sync> message, the CPU 30 uses the real time clock 31 to correlate (remember) the actual real, correct time that the counter 14 was at value zero.

Whenever the host CPU 30 transmits a time stamped fader control message to CPU 12, it computes the appropriate counter value that the counter 14 will reach when it will be the correct real time to achieve the desired fader control position. This computation is performed by the CPU 30 with the knowledge of stored positions and the synchronisation time of the zero value previously received from the control console 1.

Figure 2:
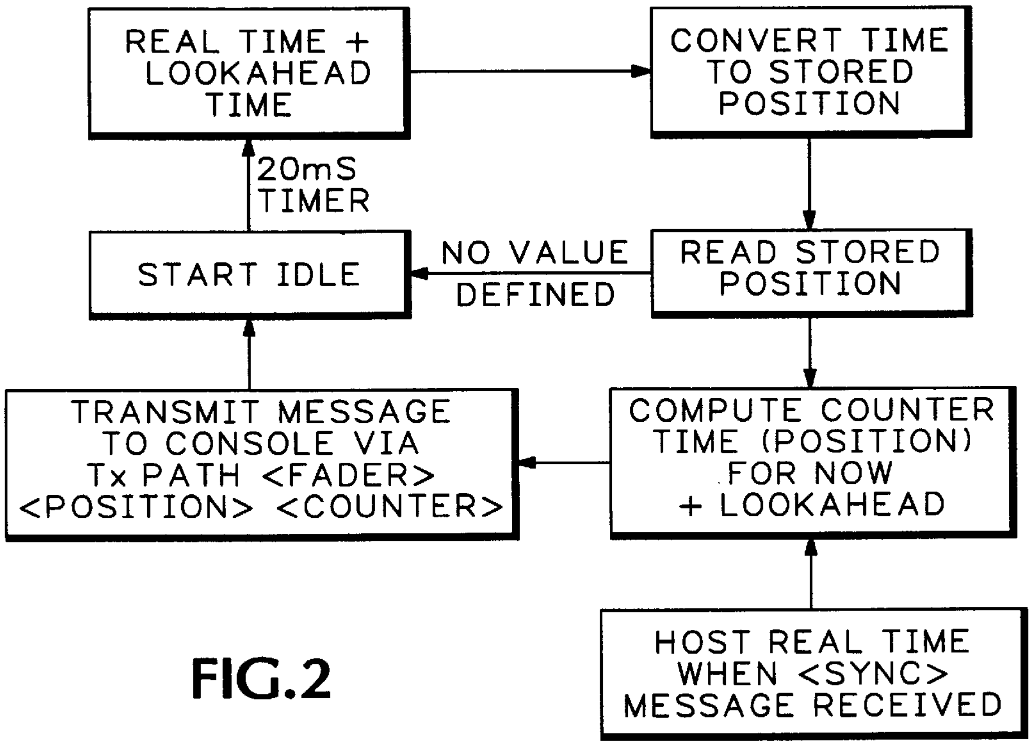
FIG. 2 shows a host computer state diagram.

FIG. 2 shows the state diagram for the host CPU 30. Starting at IDLE, the CPU 30 periodically triggers the fader control, e.g. at periods of 20 ms, as will now be described.

The CPU 30 uses a fixed "lookahead" time which is a time deemed to be sufficient to overcome fader inertia and delays on the network as well as any possible delays in the host CPU performing the requisite calculations. In this respect the host CPU 30 is not dedicated to fader control and is used to run the host computer system operating system, e.g. DOS or NT, support front end of user interface and running of files stored disk input/output. In the currently preferred embodiment the "lookahead" time is 80 ms ahead of the actual, real time the fader position is desired to be achieved.

The host CPU 30 converts the real time plus the "lookahead" time to a position of the counter 14 where it will be at that "lookahead" time. In other words, the CPU 30 predicts the position where the audio signal will be in terms of the counter position 14 at real time plus "lookahead" time (80 ms). In performing such a computation, the CPU 30 uses the last <sync> time stamp from the counter 14 in real time to perform the conversation.

Thus the computation is:

real time+"lookahead" time−<sync> in real time (i.e. current counter position in real time), and divide the result by the cycle rate of the counter 14 (5 ms in the present embodiment)

to provide the predicted value/position of the counter 14 for a desired fader control position.

The counter positions and appropriate fader control positions are located in a timetable (shown in FIG. 4 to be described later herein) which is written to and read from. If, when the stored position value is read from the counter position timetable of FIG. 4 and no change is noted, then the CPU returns to the IDLE position.

Thus the host CPU 30 now has a fader control identifier, a fader control position and a time at which it is to be at the desired position. The above mentioned first message is transmitted to the CPU 12.

The host CPU 20 may have a cycle rate of 20 ms for a given fader and advantageously this rate is related to a TV system video field rate. In the present embodiment 20 ms is the PAL video field rate.

Figures 3, 4:
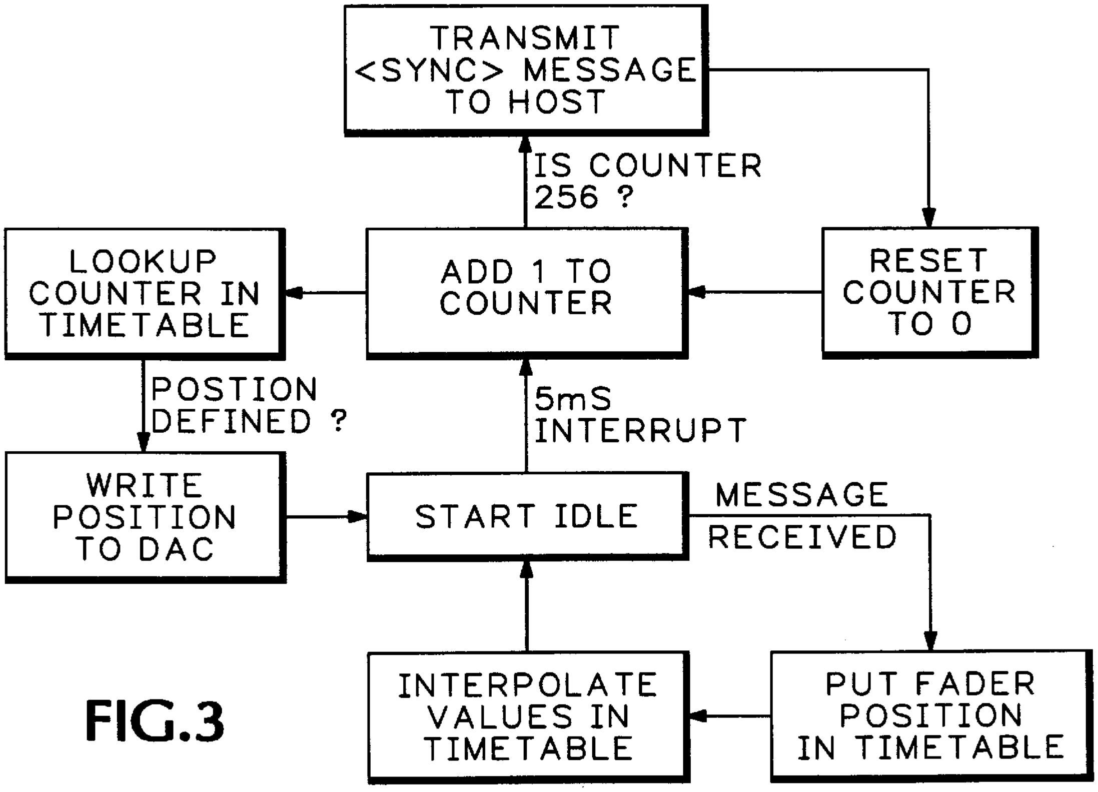
FIG. 3 shows a control console state diagram.
FIG. 4 shows a stored counter position timetable and desired fader control position.

Referring to FIG. 3, the control console CPU starting from idle provides an interrupt to the counter 14 at 5 ms intervals to increment the counter 14. Each time the counter reaches a count of 256 it is returned to zero and at that time the above mentioned second, <sync> message is transmitted to the host CPU 30. At that time the CPU 30 reads the real time from clock 31 and it is that synchronised real time that is taken away from the present real time plus "lookahead" real time and the result is divided by the console counter rate. On receipt of a time stamped fader control message, the CPU 12 places the counter position in a timetable store as shown in FIG. 4, which is notionally marked out in terms of 5 ms counter increments. The timetable also contains fader control positions which, at the appropriate time, are transmitted via the DAC 13 to the fader control 10.

Thus the CPU 12 maintains a timetable of fader control positions in 5 ms increments and maintains in the timetable an entry corresponding to the counter 14 value. At each period of 5 ms, the CPU 12 moves to the next entry and writes any new fader control position to the DAC 13 for incrementing the fader 10.

Since the time stamped messages transmitted from the host CPU 30 will always correspond to a future timetable entry, there may well be empty timetable entries between the present time and the command time due to the different work rates of the CPUs of 20 ms for the host and 5 ms for the control console, so that only every fourth position is filled. The CPU 12 is able to interpolate intermediate positions between values between the current position and the next command position and is arranged to fill the empty timetable values with interpolated fader control positions. Such interpolation is important for smoothing the movement of the fader and allows future intermediate values to be predicted and written to the timetable of FIG. 4. Furthermore, such interpolation allows the CPU 12 to work on a higher resolution of fader control positions than the host CPU 30. Thus, in the present embodiment, the CPU 30 despatches a timed message for a given fader control every 20 ms but the CPU 12 writes to the DAC 13 every 5 ms so that there is 4× oversampling.

In use, an audio signal is manipulated by an editor using the fader control 10 and the audio signal is transmitted from the control console 1 to the host computer system to be stored on the disk drive memory 32. The audio signal can be played via the CPU 30, DSP 33, DAC 34 on the speaker 35. When an editor wishes to modify the audio signal, it is retransmitted from the host computer system 3 to the control console 1. When the editor moves the fader control 10 the new position is stored on the disk drive memory 32.

The present invention has the advantage that the fader control position is moved ahead of time so that any inertia in the fader control or delays in the transmission path may be eliminated by the forementioned early movement of the fader control.

What is claimed is:

1. An audio signal fader control system comprising:

a controller coupled to receive signals output by a fader control and to apply signals to the fader control;

a host processor coupled to the controller by a transmission path for sending messages to and receiving messages from the controller; and a timing circuit coupled to the controller and the host processor for arranging that the messages from the processor are applied to the controller so that the controller drives the fader control to a desired position a predetermined period prior to a time that the fader control is required to be at the desired position such that inertia and delays in the audio signal fader control system are overcome.

2. The audio signal fader control system as recited in claim 1 wherein the timing circuit comprises:

a counter situated in the controller, the counter being clocked periodically by the controller at a first predetermined rate and providing a sync message to the host processor at predetermined intervals; and a realtime clock situated in the host processor, the host processor providing fader control messages to the controller at a second predetermined rate less than the first predetermined rate by a predetermined integer factor, the fader control messages being based upon the sync messages from the controller, the realtime clock and a predetermined lookahead time so that the fader control is driven to the desired position prior to the time it is required to be at the desired position.

3. The audio signal fader control system as recited in claim 2 wherein the controller further comprises:

a table having fader control commands generated by the controller from the fader control messages from the host processor at the second predetermined rate; and means for interpolating fader control commands between the fader control commands generated from the fader control messages at the first predetermined rate, the fader control commands being used to drive the fader controls at the first predetermined rate.

4. A method of operating an audio signal fader control system comprising the steps of:

receiving a sync signal from a controller at a predetermined interval;

based upon the sync signal, a realtime clock signal and a lookahead time generating fader control commands for the audio signal fader control system so that a fader control is driven to a desired position a predetermined period prior to when it is required to be at the desired position.

* * * * *